Oct. 3, 1950 W. W. HANSEN Re. 23,277

HIGH-FREQUENCY RESONATOR TUBE

Original Filed April 26, 1943 2 Sheets-Sheet 1

INVENTOR,
WILLIAM W. HANSEN, DECEASED,
BY THE BOARD OF TRUSTEES OF
LELAND STANFORD JUNIOR UNIVERSITY,
BY Paul B. Hunter,
ATTORNEY Oct. 3, 1950 W. W. HANSEN Re. 23,277

HIGH-FREQUENCY RESONATOR TUBE

Original Filed April 26, 1943 2 Sheets-Sheet 2

INVENTOR,
WILLIAM W. HANSEN, DECEASED,
BY THE BOARD OF TRUSTEES OF
LELAND STANFORD JUNIOR UNIVERSITY,
BY
Paul B. Hunter
ATTORNEY Reissued Oct. 3, 1950

Re. 23,277

UNITED STATES PATENT OFFICE 23,277

HIGH-FREQUENCY RESONATOR TUBE

William W. Hansen, deceased, late of Stanford University, Calif., by the Board of Trustees of Leland Stanford Junior University, assignee, Stanford University, Calif.

Original No. 2,420,314, dated May 13, 1947, Serial No. 484,648, April 26, 1943. Application for reissue July 6, 1950, Serial No. 172,395

35 Claims. (Cl. 250—27.5)

Matter enclosed in heavy brackets [ ] appears in the original patent but forms no part of this reissue specification; matter printed in italics indicates the additions made by reissue

The present invention relates generally to high frequency electron discharge apparatus having directly attached hollow resonators, and is more particularly related to velocity modulation electron discharge devices of the type disclosed in Varian Patent No. 2,242,275, issued May 20, 1941, and Hansen et al. Patent No. 2,259,690, issued October 20, 1941. The present invention is a continuation-in-part of copending Hansen and Ginzton application Serial No. 417,228, filed October 31, 1941, *now Patent No. 2,391,016.*

The present invention more specifically relates to modifications of the devices of the above patents wherein the evacuated portion of the discharge device is substantially confined to the electron beam path, and wherein the frequency range of such tube structures and resonators is considerably extended.

The principal object of the present invention is to provide novel practical embodiments of high frequency tube structures using resonators in which the evacuated portion of the tube is substantially confined to the electron beam path and the resonators are made external to the evacuated portion and are adapted to be at least partially removable.

Another object of the invention is to provide improved removable resonators for use with electron beam tubes, such resonators being external to the evacuated envelope of the tube whereby a minimum amount of metal is exposed to the vacuum itself, thus eliminating sources of gases which have previously tended to decrease the life of the tube by impairing its vacuum.

Still another object of the present invention is to provide a series of interchangeable removable external resonators for such an electron beam tube, whereby the frequency range over which the device may operate may be extended greatly beyond that provided by tuning devices usually used with such resonators.

A further object of the invention is to provide an improved cavity resonator, one element of which is removable and replaceable by an element of different size to provide a different resonant frequency.

Another object of the invention is to provide a resonator with a removable element, so designed that tuning devices and energy coupling devices may remain attached to the non-removable portion of the apparatus, and may thus be permanently connected to the device while permitting interchangeability of a part of the resonator itself, to permit change in the operating frequency of the device.

A further object of the present invention is to provide improved ultra high frequency electron discharge tube structure adapted to efficiently and conveniently operate as an ultra high frequency oscillator or receiver.

Other objects and advantages will become apparent from the specification taken in connection with the accompanying drawings wherein the invention is embodied in concrete form.

Figure 1:
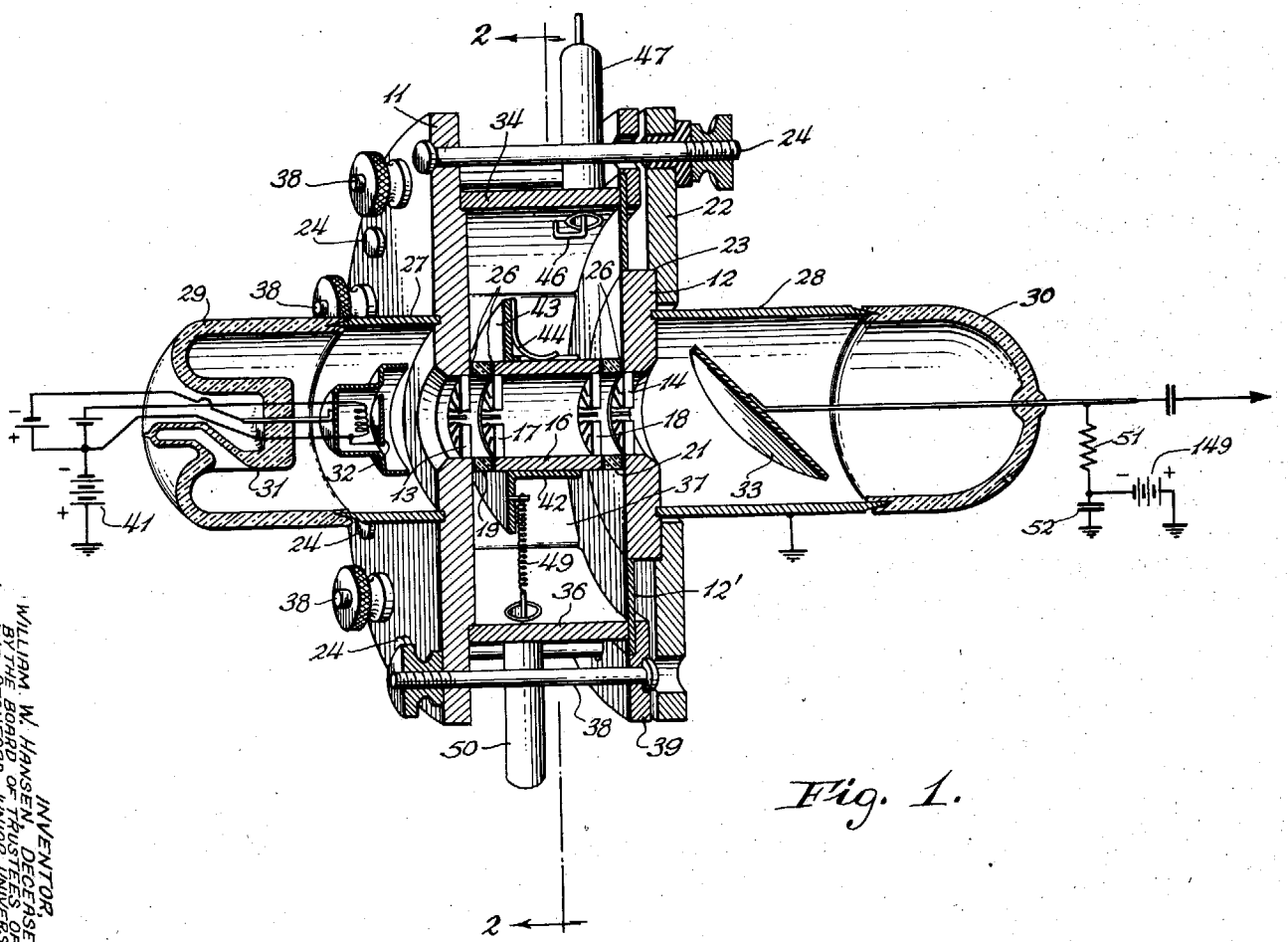
Fig. 1 shows a perspective view partly in section of one embodiment of my invention.

The electron tube of Fig. 1 is formed with two substantially parallel plates 11 and 12 of conducting material, in which are inset respective electron permeable grids 13 and 14, which are shown in the present instance as formed of thin radial strips which are alternately long and short, and thereby provide efficient interaction with an electron beam projected therethrough. Any suitable form of electron permeable grid or electrode adapted to interchange energy with an electron beam passing therethrough may be used here. Located between plates 11 and 12 is a conductive cylinder 16 which carries similar grids 17 and 18 in its ends. Cylinder 16 is insulated from plates 11 and 12 by respective insulating rings 19 and 21, which are preferably of a material having good ultra high frequency efficiency, such as quartz or high quality ceramic material. Cylinder 16 is supported by being clamped in position between plates 11 and 12 with insulating ring spacers 19 or 21 at either end. For this purpose, a clamping collar 22, which engages a shoulder 23 on plate 12, is fastened to plate 11 by means of bolts 24. It will be seen that upon tightening bolts 24 pressure is applied between collar 22 and plate 11, which is transmitted to plate 12 and thereby holds cylinder 16 between insulating rings 19 and 21.

The interior of cylinder 16 is made part of the evacuated vessel in which the electron beam is projected. For this purpose, suitable gaskets, such as the usual lead-wire gaskets 26, are inserted between insulating rings 19, 21 and plates 11, 12 and cylinder 16. Then, upon tightening bolts 24, not only is cylinder 16 supported in place, but also a vacuum-tight seal is provided.

If desired, ordinary ceramic-to-metal seals could be used here.

Plates 11 and 12 effectively form conductive extensions of grids 13 and 14, respectively, and connect these grids, which are within the evacuated portion of the device, to the exterior non-evacuated portion of the apparatus. Similarly, the respective ends of cylinder 16 effectively form conductive extensions of grids 17 and 18, and connect these grids to the non-evacuated portion of the device at the exterior surface of cylinder 16. Cylinder 16 can be considered as having two separate functions. The first function is to serve as a portion of the evacuated envelope, and is effected by its inner surface (subject to vacuum pressure). The second function is to connect grids 17 and 18 and form part of the resonator wall, which may be considered to be effected by the outer surface of cylinder 16 (subject to atmospheric pressure), since the high frequency conduction current flow in the resonator of which cylinder 16 is a part takes place entirely on this outer surface.

The innermost portion of cylinder 16 thus serves as part of the evacuated or vacuum envelope, while the outermost portion of cylinder 16 serves as part of the cavity resonator, as will hereafter appear.

Fastened to plates 11 and 12 by any suitable means, such as welding or soldering, are respective tubular supports 27 and 28. Support 27 also forms a part of the evacuated vessel whose boundary is completed by glass or other insulating end bell 29 having an inwardly directed press 31 supporting a cathode 32, as is indicated somewhat schematically in the figure. Instead of having the tubular support 27 affixed to plate 11, with the end bell 29 sealed thereto, the end bell 29 may be extended and held clamped against plate 11, in any suitable manner, maintaining the vacuous condition of the interior of the device.

Supporting tube 28 similarly carries a target electrode or detector plate 33 by any suitable convenient means, such as a similar end bell 30. Plate 33 is preferably disposed at an angle to the axis of the device, for reasons which will be later disclosed.

In order to complete the resonant circuit or cavity resonator used with the present device, a cylindrical shell is supported between plate 11 and plate 12. In the present instance this shell is shown as formed of four arcuate sections in order to permit removal without disassembling the tube or impairing its evacuated condition. These sections 34, 35, 36 and 37, when placed together, form a complete cylindrical shell which is held clamped between plate 11 and plate 12 by means of suitable clamping bolts 38 extending between a collar 39 bearing on plate 12 and plate 11. In order that clamping and unclamping of the cylindrical shells 34 to 37 will have no effect upon the support or sealing of cylinder 16, plate 12 is made with a flexible section 12′ of reduced cross-section. This may be constructed by machining down the plate 12, or by suitably fastening a thin plate 12′ to the thicker central portion of plate 12. Collar 39 then bears upon the flexible section 12′ and provides good electrical contact between plates 11 and 12′ and the cylindrical sections 34, 35, 36 and 37. It will be clear that any number of cylindrical sections may be utilized, but four have been found to be convenient.

It will be seen that by supplying a plurality of sets of these sections 34 to 37, having different diameters, the size of the resonant chamber may be changed so that the operating range of the device may be appreciably extended. Also, the joints between the arcuate sections 34—37 will have no effect on the operation of the device, since these joints do not extend across the direction of current flow on the resonator walls, but are parallel to the current flow. The joints between each of the arcuate sections and plates 11 and 12′ are more important, but harmful effects are minimized by the good contact provided by the clamping arrangement. Of course, any other desired clamping arrangement could be used. Also, if desired, insulating rings 19 and 21 could be permanently sealed to cylinder 16 and plates 11 and 12, by any suitable insulator-to-metal seal.

The device thus far described will, therefore, operate essentially in the same manner as described in Patent No. 2,259,690, and by suitable choice of the accelerating voltage applied to the electron beam by means of a suitable potential source, such as indicated by battery 41, oscillations may be set up within the resonant chamber. As discussed in this patent, for best operation the effective voltage appearing across grids 13 and 17 should be less than that appearing across grids 18 and 14. This may be accomplished by suitably selecting the relative lengths of the gaps between these pairs of grids. By the present invention, however, the relative voltages between the two pairs of grids may be adjusted so that the optimum value can be suitably selected without changing the grid spacing.

For this purpose, a sleeve 42 is slidably mounted upon the cylinder 16, and carries a plate or flange 43 which is parallel to wall 11. To assure good electrical contact between cylinder 16 and flange 43, and to hold sleeve 42 fixed once it is adjusted, a flexible spring member 44 may be provided having spring contact with cylinder 16. By adjusting the position of flange 43 before the outer cylindrical shell is put in place, the relative capacitances and hence the effective voltages at the respective gaps may be suitably adjusted to the proper value.

Energy may be abstracted from the apparatus by means of a coupling loop 46 and an output concentric transmission line terminal 47 fixed to cylindrical shell section 34. If desired, this terminal may be located in either plate 11 or 12.

It has been discovered that during operation the electron beam passing through grids 17, 18 and cylinder 16 tends to charge up this cylinder and thereby create harmful effects upon the operation of the device. To prevent this, a direct conductive connection for dissipating static charges is provided between flange 43 and the casing of the device by means of a coiled wire 49. By coiling this wire 49, it remains a relatively high impedance at the ultra high frequencies involved, and, therefore, has little effect upon the field distribution within the resonator. Furthermore, wire 49 is located at or near the voltage node in the oscillating electromagnetic field within the resonator, so that its effect upon the field is further minimized. To assure that substantially no oscillatory current flows in wire 49, it is not directly connected to shell 34—37, but is connected to the inner conductor of a quarter-wave concentric transmission line section 50, whose outer conductor is connected to shell 35. Since line 50 presents a very high, theoretically infinite, impedance at its open end, any current in wire 49 is further minimized.

In operation, the electron beam passes successively through the gap between grids 13 and 17, through the interior of cylinder 16, and through the gap between grids 18 and 14. During its passage through the first gap, the beam is velocity modulated by the oscillating field there present, and thereafter becomes grouped upon passage through the drift space provided by cylinder 16. Grids 17 and 18 serve to substantially completely shield the drift space from the oscillating field of the resonator. Upon passing through the second gap between grids 18 and 14, the beam now gives up energy to sustain the oscillating field within the resonator. In this manner, oscillations may be generated by the device. The electrons thereafter impinge upon the target electrode 33. This electrode may be grounded, if desired, and will then collect all the electrons of the beam. Electrode 33 is slanted so that secondary electrons will not return through grid 14, but will be collected by the wall of tube 28. Preferably, suitable cooling means, such as cooling coils wound around tube 28, are provided.

The present device may also operate as a superheterodyne converter. Thus, modulated ultra high frequency energy may be fed into the resonator of the device by way of transmission line 47 and loop 46. The frequency of the resonator, (that is, the frequency at which the device would generate oscillations) is then selected or adjusted to differ from the carrier frequency of the incoming modulated energy by just the amount of the desired intermediate frequency. Then a negative potential is applied to detector plate 33, as by means of a suitable source such as battery 149, through an output or load resistor 51. A by-pass condenser 52 serves to by-pass high frequency currents around the battery 149. The potential on detector plate 33 is so chosen that either all or substantially none of the electrons of the beam would be collected thereby in the absence of oscillations in the resonator. Then, when oscillations are supplied to the resonator, by way of the input line 47 or by the action of the electron beam, the electrons leaving grid 14 will have higher and lower velocities than the velocity of the beam without oscillations in the resonator. If the detector 33 is biased to just collect all the electrons of average velocity, those of lower velocity will be repelled so that the current passing through resistor 51 will vary in accordance with the velocity of the electrons and therefore will vary in accordance with the field in the resonator. When the voltage on detector plate 33 is adjusted to just repel all average velocity electrons, then faster electrons produced by the velocity modulation in the device will be collected, while slower electrons will not. This also will serve to vary the current through resistor 51 in accordance with the variation in electron velocity.

When the modulated carrier has a frequency differing from the self-oscillatory frequency of the device, the voltage appearing across resistor 51 will represent the modulated intermediate frequency and may be supplied to succeeding intermediate frequency stages for use as desired. If the modulated carrier has the same frequency as the self-oscillatory frequency of the device, the device will operate as a homodyne receiver and the modulation of the incoming wave will appear as a signal voltage across resistor 51 and may be utilized as desired.

The present device overcomes one of the greatest difficulties inherent in the device of the previous Patent No. 2,259,690. In that patent, the central cylindrical conductor, corresponding to cylinder 16, was suspended or "floated" in a vacuum within the resonator shell. As a result, the heat unavoidably generated in this cylinder by the action of the electron beam passing through the grids could not be dissipated readily, and much trouble was experienced with burned out grids. In the present device, however, the outer surface of the cylinder 16 is in the non-evacuated portion of the device and cooling air may be conducted over it for cooling purposes. This may be done in the present device by connecting one of the tubes 53 communicating with the interior of the cylindrical shells 34—37 to a suitable source of cooling fluid such as an air hose.

Figure 3:
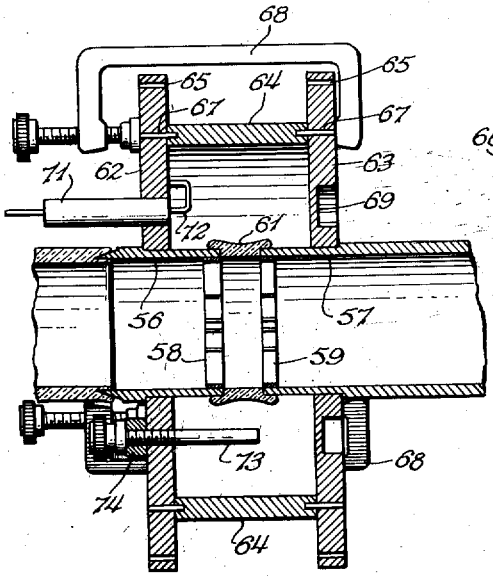
Fig. 3 shows a longitudinal cross sectional view of a modification of the present invention.
Figure 4:
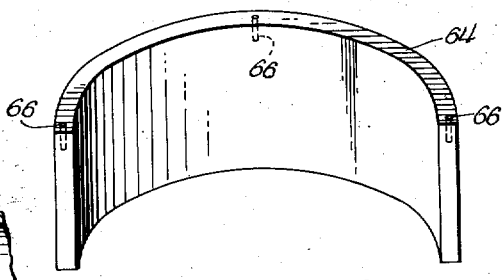
Fig. 4 is a perspective view of the removable part of the resonator of Fig. 3.

[Some of the features of the present invention can also be applied to regular "Klystron" tubes, such as of the type described in the above-mentioned Varian Patent 2,242,275 or in Varian Patent No. 2,250,511. A portion of such a device is shown in Figs. 3 and 4. These figures merely illustrate the construction of one resonator for such a tube, it being understood that such a tube will normally utilize two such resonators in cascade, and that suitable means for projecting an electron beam successfully through the grids of these resonators and for collecting the beam will also be provided.]

*The features of a non-evacuated external resonator portion and of demountability thereof and interchangeability of resonator parts are not limited to the type of klystron tube shown in Fig. 1. The features are generally useful for klystron tubes involving one or more resonators. Varian and Hansen Patent No. 2,250,511 and Varian Patent No. 2,242,275 illustrate tube types wherein these features may be included, the evacuated envelope configuration of the principal embodiment of Varian Patent No. 2,242,275 being required to be revised to a smaller-diameter generally cylindrical form for inclusion of these features therein.*

*The velocity modulation tube versions shown in Patent No. 2,250,511 include annular resonator portions which are slitted for flexibility and are each attached along two junction surfaces to the grid flanges of the evacuated tube units, the interiors of these annular resonator portions being at atmospheric pressure.*

*A different construction for the non-evacuated resonator portions from that of Patent No. 2,250,511 is shown in Figs. 3 and 4. A resonator of this type comprises several rigid parts external of the evacuated envelope instead of one flexible external portion formed of sheet metal as shown in Patent No. 2,250,511. Whereas the latter provides for a substantial tuning range by deformation of the flexible outer shell portion, the composite construction with rigid elements facilitates major frequency changes by substitution of parts. With either construction, the feature of construction and evacuation of the envelope containing the electron gun and the specially aligned electrodes including the plural grids is provided, whereby a given evacuated tube unit may be provided with an external resonator portion arranged according to the way in which the tube is to be used.*

*Where a tube is to employ more than one resonator, plural pairs of grids may be employed in the evacuated envelope, and plural external resonator units may be arranged respectively thereon.*

In Fig. 3 a portion of the evacuated envelope of the device is formed by a pair of aligned tubular members 56 and 57 which carry respective electron permeable grids 58 and 59 in the adjoining ends thereof. Grids 58 and 59 may be of the same type as the grids shown in Fig. 1, or of any other suitable type, and are positioned adjacent to one another to provide a relatively narrow gap therebetween. The evacuated container is maintained vacuously continuous by means of a suitable insulating ring 61 sealed between tubes 56 and 57. Fixed to tubes 56 and 57 are respective conducting plates or flanges 62 and 63 which are similar in function and purpose to the plates 11 and 12 of Fig. 1. These plates 62 and 63 are adapted to retain a cylindrical shell 64 therebetween. Shell 64 corresponds to shell 36—37 of Fig. 1. In this instance, shell 64 is illustrated as being formed of two semi-cylindrical sections, each being as shown in Fig. 4, and is provided with a plurality of small locating holes 66 which coact with corresponding holes in the plates 62 and 63, through which locating pins 67 may be passed to position shell 64 concentrically surrounding the grids 58, 59 and the electron beam.

Shell 64 is then held tightly between plates 62 and 63 by means of suitable clamps illustrated at 68. It is to be understood that, if desired, the clamping arrangement of Fig. 1 may be utilized here, and, conversely, the clamping arrangement of Fig. 3 might be used in Fig. 1, if desired. In order to prevent impairment of the seal 61 or of the joints between the tubes 56 and 57 and the plates 62 and 63, preferably one of the plates, such as 63, is provided with a section 69 having reduced cross section which will be relatively flexible and will prevent the transmission of strains due to clamping. It will be seen that this flexible section 69 is similar in function and purpose to the section 12′ of Fig. 1.

Plates 62 and 63 may be provided with a plurality of sets of resonator shell locating holes 65 so that shells of differing diameters may be interchanged with the same apparatus to provide corresponding differing operating frequency ranges.

In the present illustration, the output concentric line 71 and coupling loop 72 are fixed to the permanent wall 62 of the resonator instead of to the removable wall 34 of Fig. 1. However, either of these arrangements can be utilized, in either Fig. 1 or Fig. 3, as desired. Also, Fig. 3 shows a type of tuning device for adjusting the resonant frequency of the resonator over a small range. For this purpose, a preferably conductive plug 73 is made adjustably insertable within the resonant cavity, as by means of a suitable threaded arrangement 74 in the wall 62, and will thereby adjust the resonant frequency of the resonator in the manner taught in the above-mentioned Hansen et al. Patent 2,259,690. It will be clear that a similar type of tuning adjustment may be provided in Fig. 1, if desired. Also, this tuning arrangement may be located in a removable wall, but this is less advantageous.

It will be seen that Fig. 3 therefore provides a single resonator having reentrant poles formed by tubes 56 and 57 in which the grids 58 and 59 provide a relatively narrow gap for coupling the resonator with an electron beam to be passed therethrough. The particular construction here, as in Fig. 1, permits the use of interchangeable resonator shells to vary the size of the resonator and thereby vary the desired operating frequency of the device accordingly.

Figure 2:
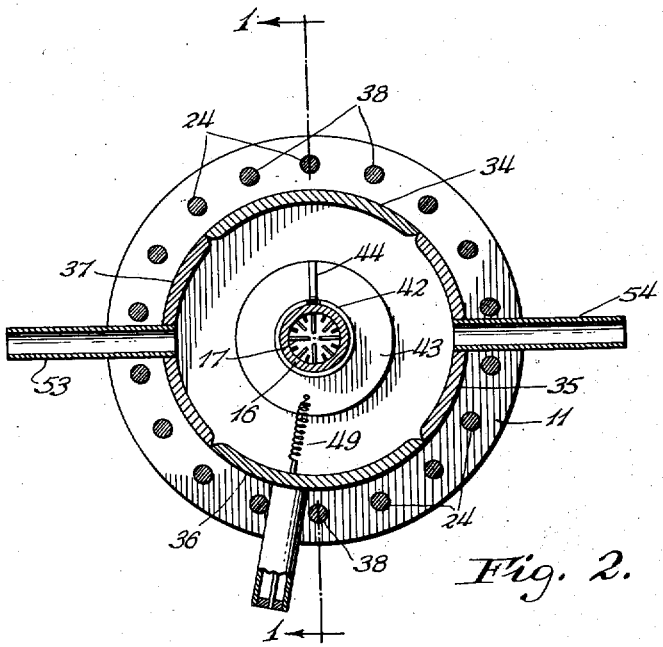
Fig. 2 is a transverse cross sectional view of the device of Fig. 1.

Although in Figs. 3 and 4 the resonator shell 64 is shown in two separate sections, it will be understood that any suitable number of sections may be supplied as desired. Furthermore, instead of rendering these sections entirely separable, they may be hinged together for convenience of assembly and storage. If desired or necessary, cooling fluid may be passed through the resonator to dissipate the heat generated in grids 58 and 59 in a manner similar to that shown in Figs. 1 and 2.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Ultra-high-frequency velocity-modulation apparatus comprising a pair of spaced conductive plates having aligned apertures, an electron-permeable grid fixed within each of said apertures, a conductive cylindrical member positioned between and insulated from said plates and axially aligned with said apertures and grids, said cylindrical member supporting an electron-permeable grid at each end thereof, whereby a pair of gaps are produced, each gap being defined by a plate grid and a cylinder grid, means vacuously sealing said cylinder to each of said plates and forming part of the evacuated envelope of said apparatus, a plurality of removable conductive members forming a cylindrical shell between and connected to said plates, said shell forming a cavity resonator with said plates, grids and cylindrical member, and means adjacent one of said gaps for projecting an electron beam successively through one of said gaps, the interior of said cylindrical member and the other of said gaps, whereby ultra-high-frequency oscillations may be set up in said resonator.

2. Ultra-high-frequency velocity-modulation apparatus comprising an evacuated envelope, means inside said envelope for projecting an electron beam through the interior of said envelope, two pairs of electron-permeable electrodes positioned in said envelope for interaction with said beam and forming two gaps to be successively traversed by said beam, each of said electrodes having connected conductive portions extending outside said envelope, and cylindrical conductive means connecting one electrode of each of said pairs to an electrode of the other of said pairs and forming a cavity resonator having a pair of gaps defined by said electrodes, whereby oscillations may be set up in said resonator by the action of said beam passing successively through one of said gaps, one of said cylindrical means and the other of said gaps.

3. Ultra-high-frequency velocity-modulation apparatus comprising an evacuated envelope, two pairs of electron-permeable electrodes within said envelope defining a pair of aligned electron-permeable gaps, conductive means exterior to said envelope and connected to all of said electrodes and forming with said two pairs of electrodes a cavity resonator having concentrated electric field portions at said two gaps, and means in said envelope for projecting an electron beam successively through said gaps to set up oscillations within said resonator.

4. Apparatus as in claim 3, wherein said conductive means comprises a conductive shell connecting the outer ones of said electrodes and a conductive cylinder connecting the inner ones of said electrodes, said cylinder forming a field-free drift space through which said electron beam passes between said gaps.

5. Ultra-high-frequency velocity-modulation apparatus comprising an evacuated envelope, two pairs of electron-permeable electrodes within said envelope defining a pair of aligned electron-permeable gaps, conductive means exterior to said envelope and connected to all of said electrodes and forming with said two pairs of electrodes a cavity resonator having concentrated electric field portions at said two gaps, said conductive means comprising a conductive plate connected to each of the outer ones of said grids, and a cylindrical conductive member connecting together the inner ones of said grids, a conductive sleeve slidably mounted on and contacting said cylindrical member, a conducting flange carried by said sleeve parallel to one of said plates, whereby the electric field at one of said gaps may be adjusted by adjusting the spacing between said one plate and said flange, and means in said envelope for projecting an electron beam successively through said gaps to set up oscillations within said resonator.

6. Apparatus as in claim 3, wherein said conductive means comprises a conductive plate connected to each of the outer ones of said electrodes and a multi-piece cylindrical conducting member removably connected between said plates and forming the outer shell of said resonator, whereby resonators of differing resonant frequency may be formed by replacing said conducting member by others of different dimensions.

7. Apparatus as in claim 3, further including means in said apparatus for adjusting the relative effective alternating voltages across said gaps.

8. Electron discharge apparatus comprising an evacuated envelope, two pairs of electron-permeable electrodes within said envelope defining a pair of aligned electron-permeable gaps, conductive means exterior to said envelope connected conductively to said electrodes and forming therewith cavity resonator means having said gaps as portions thereof, and means in said envelope for projecting an electron beam successively through said gaps to set up oscillations within said resonator means.

9. A high frequency tube structure comprising an evacuated insulating envelope, two pairs of spaced conducting grids within said envelope, means in said envelope for setting up an electron beam for traversing said envelope, a non-evacuated cavity resonator surrounding said envelope, said cavity resonator having interior wall means spaced from the outer walls of said resonator, said wall means and said outer walls being connected to said grids to establish a pair of regions between the pairs of grids adapted to contain alternating electric fields acting upon the electron beam, whereby one of said fields produces recurrent changes in velocity of electron beam and the other of said fields produces an interchange of energy between the beam and the resonator.

10. Electron-discharge apparatus comprising an enclosing envelope having a tubular portion, means in said envelope for projecting an electron beam through said tubular portion along the axis thereof, a target electrode along the path of said beam for receiving said beam, and means in energy-interchanging relation with said beam comprising a pair of electrodes having closely spaced apertured portions within said tubular portion defining a gap to be traversed by said beam, and a removable resonator-shell-defining means exterior to said envelope and connected to said pair of electrodes through said envelope.

11. An ultra-high-frequency super-heterodyne converter comprising cavity resonator means for confining an oscillating electromagnetic field having two separate electric field portions separated by a field-free space and having a resonant frequency, means coupled to said resonator means for supplying modulated electromagnetic energy to said resonator means having a nominal carrier frequency differing from said resonant frequency by a desired intermediate frequency, means aligned with said resonator means for passing an electron beam successively through one of said electric field portions, said field-free space and the other of said field portions, and means along the path of said beam for detecting velocity variations of said electrons after leaving said last field portion, whereby a correspondingly modulated intermediate-frequency wave may be derived from said detector means.

12. Electron discharge appartaus comprising a tubular evacuated envelope, a pair of electron-permeable grids within said envelope, means in said envelpe for projecting an electron beam through said grids, a pair of parallel conducting plates disposed transversely of said envelope and connected respectively to said grids, and a cylindrical shell surrounding said envelope and removably fastened between said plates and forming a cavity resonator therewith, whereby the resonant frequency of said resonator may be changed by replacing said shell.

13. A high frequency tube structure comprising an evacuated insulating envelope, a pair of spaced grid structures within said envelope, means in said envelope for setting up an electron stream for passage through said grid structures, and a cavity resonator having a portion removably surrounding said envelope, said resonator being coupled to said grid structures, whereby a standing electromagnetic field within said resonator is caused to produce an electric field component between said grid structures acting upon said electron stream.

14. A high frequency tube structure comprising an evacuated envelope, spaced grids within said envelope, means in said envelope for setting up an electron stream for traversing said envelope and said grids, end wall members fixed upon the exterior of said envelope on opposite sides of said grids, and removable wall elements insertable between said end wall members for forming therewith a cavity resonator adapted to contain a standing electromagnetic field having an electric field component between said grids.

15. A high frequency tube structure as defined in claim 14 wherein tuning means is carried by one of the said fixed end wall members for effecting the tuning of said resonator.

16. A high frequency tube structure comprising an evacuated envelope, a pair of grid structures within said envelope, means in said envelope for producing a beam of charged particles for successively traversing said grid structures, and a cavity resonator removably surrounding said envelope and conductively connected to said grid structures through the wall of said envelope, said cavity resonator being adapted to contain a standing electromagnetic field for coacting with said beam.

17. Ultra-high-frequency velocity-modulation apparatus, comprising a pair of spaced conductive plates having aligned apertures, a conductive cylindrical member positioned between said plates and axially aligned with said apertures, whereby a pair of gaps are formed, each gap being defined by one of said plates and an end of said cylindrical member, a cylindrical shell connected to said plates and forming a cavity resonator with said plates and said cylindrical member, means aligned with said gap for projecting an electron beam successively through one of said gaps, the interior of said cylindrical member and the other of said gaps, whereby oscillations are produced within said cavity resonator, and means in said apparatus for adjusting the relative effective alternating voltages across said gaps without variation of said gaps.

18. Ultra-high-frequency velocity-modulation apparatus comprising a pair of spaced conductive plates having aligned apertures, a conductive cylindrical member positioned between said plates and axially aligned with said apertures, whereby a pair of gaps are formed, each gap being defined by one of said plates and an end of said cylindrical member, a cylindrical shell connected to said plates and forming a cavity resonator with said plates and said cylindrical member, means aligned with said gaps for projecting an electron beam successively through one of said gaps, the interior of said cylindrical member and the other of said gaps, whereby oscillations are produced within said cavity resonator, and means for adjusting the relative effective alternating voltages across said gaps, said adjusting means comprising a conductive sleeve slidably mounted on and contacting said cylindrical member, and a conductive flange carried by said sleeve parallel to one of said plates whereby the electric field at one of said gaps may be adjusted by adjusting the spacing between said one plate and said flange.

19. Ultra-high-frequency velocity-modulation apparatus, comprising a pair of spaced conductive plates having aligned apertures, a conductive cylinder-like member positioned between said plates and axially aligned with said apertures whereby a pair of gaps are produced, each gap being defined by one of said plates and an end of said member, means sealing said cylinder-like member to each of said plates to form part of the evacuated envelope of said apparatus, cylindrical conductive means connected between said plates and forming a cavity resonator with said plates and cylinder-like member, and means in said envelope for projecting an electron beam successively through one of said gaps, the interior of said cylinder-like member and the other of said gaps, whereby ultra-high-frequency oscillations may be set up in said resonator.

20. Apparatus as in claim 19, further including means coupled to said cylinder-like member for dissipating electric charges accumulated by said cylinder-like member.

21. Apparatus as in claim 19, further including charge dissipating means comprising a helically wound conductor connected at one end to said cylinder-like member and having its other end forming the central conductor of a short-circuited quarter-wave concentric transmission line whose outer conductor is connected to said cylindrical means.

22. Apparatus as in claim 19, further including coaxial-transmission-line means having its outer conductor connected to said cylindrical conductive means and its inner conductor connected to said cylinder-like member.

23. Ultra-high-frequency velocity-modulation apparatus, comprising a pair of spaced conductive plates having aligned apertures, a conductive cylindrical member positioned between and spaced from said plates and axially aligned with said apertures whereby a pair of gaps are produced, each gap being defined by one of said plates and an end of said member, conductive means connected between said plates and forming a cavity resonator with said plates and cylindrical member, means aligned with said gaps for projecting an electron beam successively through one of said gaps, the interior of said cylindrical member and the other of said gaps, whereby ultra-high-frequency oscillations may be set up in said resonator, and dissipating means coupled to said cylindrical member for dissipating electric charges accumulated by said cylindrical member said dissipating means comprising a helically wound conductor connected at one end to said cylindrical member and having its other end forming the central conductor of a short-circuited quarter-wave concentric transmission line whose outer conductor is connected to said cylindrical means.

24. High frequency tube structure, comprising an evacuated envelope, a pair of spaced apertured electrodes within said envelope, a cavity resonator partially removably surrounding said envelope and coupled to said electrodes whereby a standing electromagnetic field within said resonator produces an electric field component between said electrodes, and means in said envelope for passing a stream of charged particles through said electrodes.

25. Electron-discharge apparatus, comprising means defining an enclosing vessel, means at one end of said vessel for producing an electron beam, a target electrode at the other end of said vessel, a pair of electrodes between said beam-producing means and said target electrode defining a gap to be traversed by said beam, a second pair of electrodes between said beam-producing means and said target electrode defining a second gap to be traversed by said beam, and a cavity resonator including conductive wall means exposed to atmospheric pressure outside said vessel electrically connecting one of said first pair of electrodes and one of said second pair of electrodes and further conductive wall means also exposed to said atmospheric pressure electrically connecting the other electrodes of said pairs.

26. Electron discharge apparatus comprising cavity resonator means providing a pair of electron-permeable gaps and adapted to enclose a standing electromagnetic field having electric field portions at said gaps, and with predetermined effective voltages, means aligned with said gaps for projecting an electron beam successively through said portions, and means in said apparatus for adjusting the relative effective voltages across said gaps.

27. Electron discharge apparatus comprising means defining an enclosing vessel, means at one end of said vessel for producing an electron beam, a target electrode at the other end of said vessel, a pair of electrodes between said beam-producing means and said target electrode defining a gap to be traversed by said beam, a second pair of electrodes between said beam-producing means and said target electrode defining a second gap to be traversed by said beam, and a cavity resonator including a wall outside of said vessel electrically connecting one of said first pair of electrodes and one of said second pair of electrodes and conductive means electrically connecting the other electrodes of said pairs.

28. Electron discharge apparatus, comprising means defining an enclosing vessel, means at one end of said vessel for producing an electron beam, a target electrode at the other end of said vessel, a pair of electrodes between said beam-producing means and said target electrode defining a gap to be traversed by said beam, a second pair of electrodes between said beam-producing means and said target electrode defining a second gap to be traversed by said beam, and a cavity resonator outside of said vessel including means electrically connecting one of said first pair of electrodes and one of said second pair of electrodes and further including conductive means electrically connecting the other electrodes of said pairs.

29. High frequency tube structure comprising an evacuated envelope, a source of electrons within said envelope, a pair of apertured electrodes within said envelope in alignment with said source, and a further electrode in alignment with said apertured electrodes on the side thereof opposite said source, said apertured electrodes having portions extending to the exterior of said envelope and adapted to be connected to a cavity resonator whereby the electromagnetic field within said cavity resonator may produce an alternating electric field between said apertured electrodes for interaction with said electrons.

30. Electron discharge apparatus comprising means including a source of electrons for producing a stream of electrons along a predetermined path, a pair of electron-permeable electrodes mounted along said path in alignment with said source and defining a narrow gap therebetween, a pair of concentric conductive means connected respectively to said electrodes and defining therewith cavity resonator means adapted to contain a standing electromagnetic field oscillating therewithin, and means in said apparatus for adjusting the effective voltage produced by said field across said gap, said last-named means comprising a flange member adjustably supported on the inner of said conductive means and slidable toward and away from said gap for correspondingly adjusting said effective voltage.

*31. High frequency tube structure comprising an evacuated envelope, a source of electrons within said envelope, a pair of apertured electrodes within said envelope in alignment with said source, and a further electrode in alignment with said apertured electrodes on the side thereof opposite said source, said apertured electrodes including annular conductive portions surrounding said evacuated envelope and adapted to be connected to a cavity resonator in coaxial relation therewith whereby the electromagnetic field within said cavity resonator may produce an alternating electric field between said apertured electrodes for interaction with said electrons.*

*32. High frequency tube structure comprising an evacuated envelope, a source of electrons within said envelope, a pair of apertured electrodes within said envelope in alignment with said source, and a further electrode in alignment with said apertured electrodes on the side thereof opposite said source, each of said apertured electrodes comprising a grid provided with a peripheral flange, the flange being sealed in the evacuated envelope and having an annular portion exterior of said envelope adapted to be connected to a cavity resonator, whereby at least a portion of the cavity resonator will surround said evacuated envelope and the electromagnetic field within said cavity resonator may produce an alternating electric field between said apertured electrodes for interaction with said electrons.*

*33. High frequency tube structure comprising an evacuated envelope having a generally cylindrical portion comprising alternate glass and metal annular sections, a source of electrons within said envelope, a pair of apertured electrodes within said envelope in alignment with said source, and a further electrode in alignment with said apertured electrodes on the side thereof opposite said source, said apertured electrodes comprising first and second grids inside said envelope connected respectively to two of said metal annular sections separated by a glass annular section, said apertured electrodes being thereby adapted to be connected to a cavity resonator whereby the electromagnetic field within said cavity resonator may produce an alternating electric field between said apertured electrodes for interaction with said electrons.*

*34. High frequency tube structure comprising an evacuated envelope having a generally cylindrical portion comprising alternate glass and metal annular sections, a source of electrons within said envelope, a pair of apertured electrodes within said envelope in alignment with said source, and a further electrode in alignment with said apertured electrodes on the side thereof opposite said source, said apertured electrodes comprising first and second grids inside said envelope spaced apart by a dimension appreciably smaller than their diameters and connected respectively to two of said metal annular sections separated by a glass annular section, said apertured electrodes being thereby adapted to be connected to a cavity resonator whereby the electromagnetic field within said cavity resonator may produce an alternating electric field between said apertured electrodes for interaction with said electrons.*

*35. High frequency tube structure comprising an evacuated envelope having a generally cylindrical portion comprising alternate glass and metal annular sections, a pair of apertured electrodes within said envelope in alignment with said source, and a further electrode in alignment with said apertured electrodes on the side thereof opposite said source, said apertured electrodes comprising first and second grids inside said envelope connected respectively to two of said metal annular sections separated by one of said glass annular sections, said two metal annular sections including substantially parallel circular flanges of substantially equal diameters, said apertured electrodes being adapted for connection through said two metal annular sections to a cavity resonator whereby the electromagnetic field within said cavity resonator may produce an alternating electric field between said apertured electrodes for interaction with said electrons.*

THE BOARD OF TRUSTEES OF LELAND STANFORD JUNIOR UNIVERSITY,
*Assignee, by Mesne Assignment, of William W. Hansen, Deceased,*
By A. E. BRANDIN,
*Business Manager, Leland Stanford Junior University.*

(References on following page)

REFERENCES CITED

The following references are of record in the file of this patent or the original patent:

UNITED STATES PATENTS

| Number | Name | Date |
|---|---|---|
| 1,979,668 | Boddie | Nov. 6, 1934 |
| 2,044,369 | Samuel | June 16, 1936 |
| 2,222,901 | Hahn | Nov. 26, 1940 |
| 2,222,902 | Hahn | Nov. 26, 1940 |
| 2,235,527 | McArthur | Mar. 18, 1941 |

| Number | Name | Date |
|---|---|---|
| 2,242,249 | Varian et al. | May 20, 1941 |
| 2,243,537 | Ryan | May 27, 1941 |
| 2,253,030 | Maslov | Aug. 19, 1941 |
| 2,254,796 | Doring | Sept. 2, 1941 |
| 2,259,690 | Hansen et al. | Oct. 21, 1941 |
| 2,263,184 | Mouromtseff et al. | Nov. 18, 1941 |
| 2,281,717 | Samuel | May 5, 1942 |
| 2,306,282 | Samuel | Dec. 22, 1942 |
| 2,309,966 | Litton | Feb. 2, 1943 |